Dec. 19, 1961  R. E. STEIN  3,013,507
RAILWAY VEHICLE TRUCK
Filed Sept. 17, 1959  3 Sheets-Sheet 1

INVENTOR:
ROBERT E. STEIN
By Francis T. Burgess
ATTORNEY.

Dec. 19, 1961  R. E. STEIN  3,013,507
RAILWAY VEHICLE TRUCK
Filed Sept. 17, 1959  3 Sheets-Sheet 2

INVENTOR:
ROBERT E. STEIN
By Francis T. Burgess
ATTORNEY.

Dec. 19, 1961  R. E. STEIN  3,013,507
RAILWAY VEHICLE TRUCK
Filed Sept. 17, 1959  3 Sheets-Sheet 3

INVENTOR:
ROBERT E. STEIN
BY Francis T. Burgess
ATTORNEY,

United States Patent Office 3,013,507
Patented Dec. 19, 1961

3,013,507
RAILWAY VEHICLE TRUCK
Robert E. Stein, Dorsey, Ill., assignor to General Steel Industries, Inc., a corporation of Delaware
Filed Sept. 17, 1959, Ser. No. 840,692
11 Claims. (Cl. 105—182)

The invention relates to railway rolling stock, and consists particularly in a swiveling power truck for rail vehicles having body-mounted engines.

In the usual arrangements of locomotives and cars equipped with body-mounted engines and transmissions, the transmission is connected by Cardan shafts to right angle drive gearing carried by the driving axles of the vehicle. In some equipment of this type, in order to avoid interference with the truck structure, the transmission is entirely offset from the truck, lengthwise of the vehicle, but the ideal location of the transmission is at the center of the truck in order that the lateral movement of the drive shafts required during swiveling movements of the truck can approximate a simple radial movement about the universal connections of the drive shafts to the transmission as vertical axes. In conventional truck arrangements, in which the body is supported on the truck by a centrally disposed pivot center plate, there may be substantial difficulty in so locating the transmission.

It accordingly is a main object of the invention to provide a railway truck arranged to accommodate transmission structure depending from the vehicle body at the center of the truck.

It is a further object to provide a truck of this type arranged to permit lateral motion of the body relative to the truck.

It is a further object to provide a truck of this type in which laterally-spaced longitudinally-extending load-carrying sills of the body transmit the body load directly to the truck structure without the necessity of heavy transverse framing commonly known as body bolsters.

These and additional objects are achieved by the structure described below and illustrated in the accompanying drawings, in which.

Figure 1:
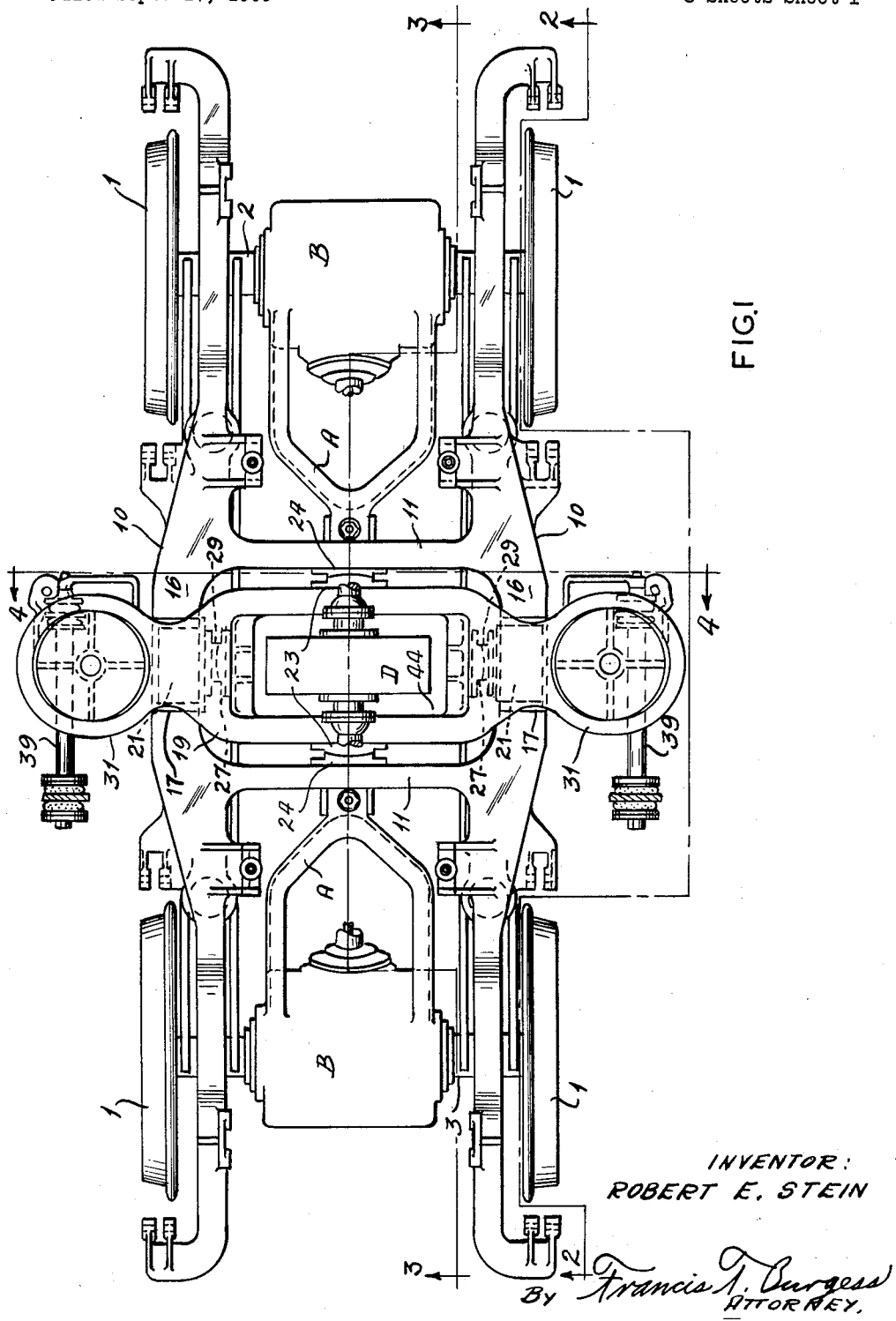
FIGURE 1 is a top view of a truck embodying the invention.
Figure 2:
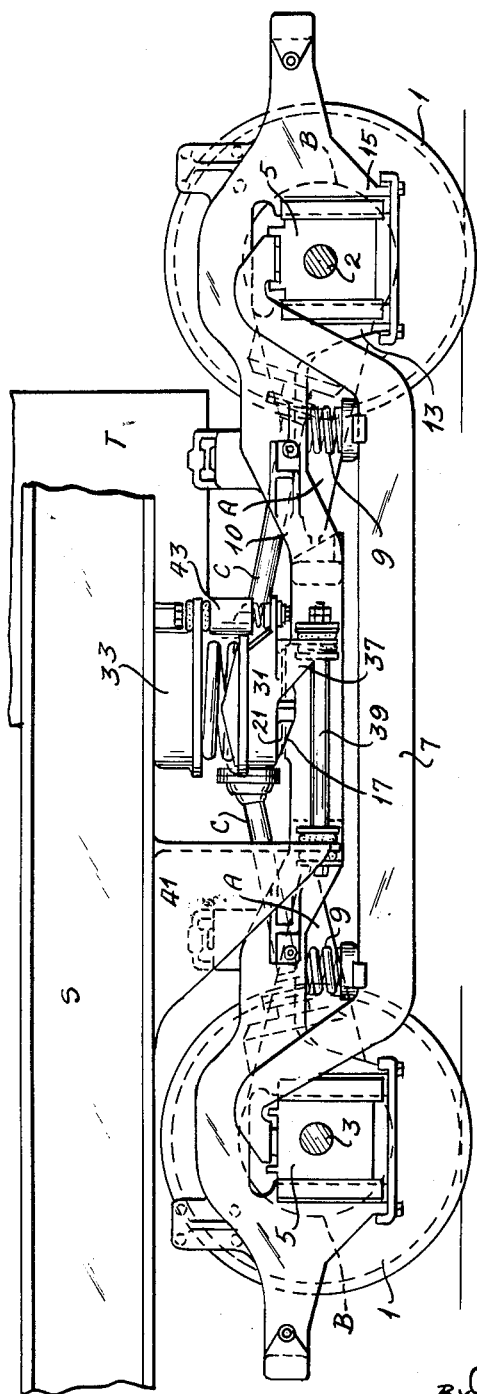
FIGURE 2 is a side view of the truck illustrated in FIGURE 1.
Figure 3:
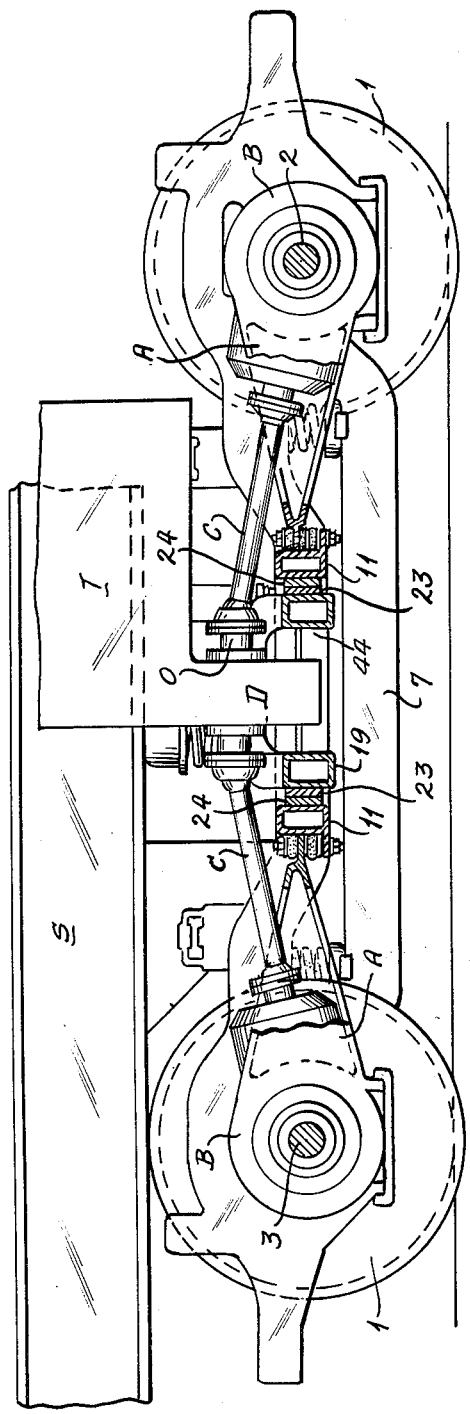
FIGURE 3 is a longitudinal vertical sectional view along the line 3—3 of FIGURE 1.
Figure 4:
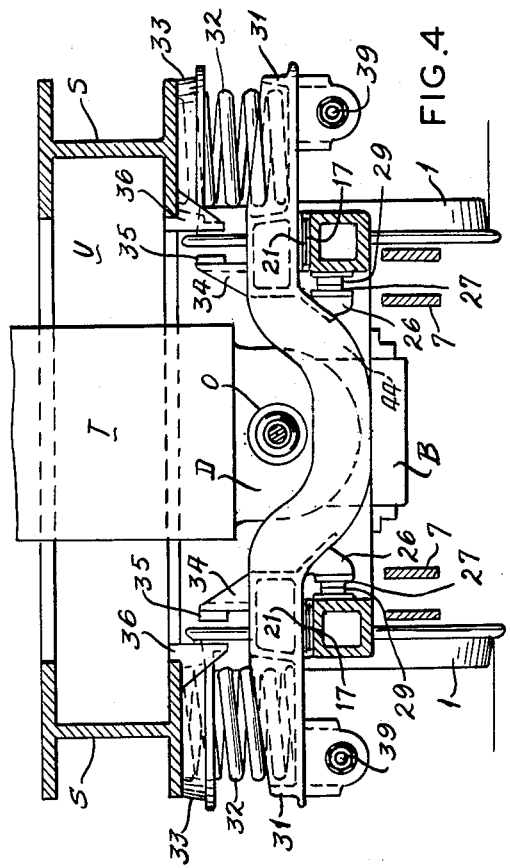
FIGURE 4 is a transverse vertical sectional view along the line 4—4 of FIGURE 1.

Referring now to the drawings, the numeral 1 refers to flanged wheels, a pair of which are rigidly mounted on the ends of each of spaced axles 2 and 3 to form a pair of rigid assemblies. Inwardly of each wheel 1, each axle rotatably mounts journal boxes 5, on the tops of which are seated the end portions of drop equalizers 7, which extend longitudinally of the truck between the axles. Near their ends, equalizers 7 mount upstanding coil springs 9, which in turn support truck frame side members 10. Side members 10 are connected to each other intermediate the wheel and axle assemblies by transversely-extending transoms 11, which are spaced apart lengthwise of the truck, to form with side members 10, a rigid one-piece truck frame. Side members 10 are each formed near their ends with spaced depending vertical pedestal legs 13 and 15 between which are vertically slidably received journal boxes 5. Intermediate the longitudinally-spaced equalizer springs 9, the truck frame side members 10 are depressed, as at 16, to a lower level than that over the springs 9, and are bowed laterally outwardly to provide greater lateral spacing in this region. Midway between the axles, depressed portions 16 are each provided with an upwardly-facing horizontal bearing 17 elongated lengthwise of the truck.

A bolster 19 extends transversely of the truck and is provided with downwardly-facing horizontal bearings 21 slidably supported on upwardly-facing bearings 17. The sides of the bolster are spaced longitudinally of the truck a slight distance from the adjacent transoms 11 and are provided with arcuate bearings 23 in engagement with mating arcuate bearings 24 on the adjacent transoms. The bearings 23, 24 are arcuate about the vertical center line of the truck and bolster in order to provide for swiveling of the bolster relative to the truck frame about this line as an axis. In addition to forming a pivot, these members also transmit draft and braking forces from the truck frame to the bolster.

Inwardly of the side members 10, the bolster is formed with laterally outwardly-facing depending abutments 26 which mount arcuate bearings 27. Bearings 27 are similarly curved about the vertical center line of the truck and are in mating engagement with correspondingly arcuate bearings 29 on the laterally inward surfaces of the truck frame side members 10. The purpose of bearings 27, 29 is to assist bearings 23, 24 in fixing the location of the pivot axis and to prevent any lateral motion of the bolster relative to the truck frame.

Outwardly of the truck frame side members 10, the bolster is formed with upwardly-open cup-shaped spring seat end portions 31 in which are seated upright coil springs 32. A vehicle underframe U including longitudinally extending laterally-spaced H-section sills S is supported on springs 32 through downwardly-open cup-shaped spring caps 33, formed on the lower flanges of the sills S. By spacing the spring laterally in this manner, substantial stability against lateral body roll is provided because of the long lateral arm through which these springs act, thus permitting the use of relatively soft springs 32, and the location of springs 32 beneath the load-carrying sills S of the underframe U provides direct transmission of the body load to the springs, thus permitting substantial lightening of the transverse underframe structure, as compared with the transverse framing that would be required if the body load had to be transmitted from the sills S to a conventionally centrally-disposed truck center bearing.

For limiting lateral movement of the underframe relative to the truck frame, as may be permitted by the deflection in shear of springs 32, bolster 19 is formed with a pair of laterally outwardly-facing upstanding abutments 34, mounting rubber bumper pads 35, and the underframe is formed with cooperating depending abutments 36, laterally spaced outwardly from abutments 35 and being adapted to engage pads 35 when predetermined maximum lateral movement occurs.

Since ample provision is made, in the form of vertical arcuate bearings 23, 24 and 27, 29 for accommodating swiveling movements of the bolster relative to the truck frame, no swiveling movements are necessary between the bolster and the vehicle underframe and accordingly, for preventing relative swiveling movements of these parts and for transmitting draft and braking forces from the truck to the vehicle underframe, while at the same time accommodating lateral movement between the bolster and vehicle underframe as may be permitted by the yieldability in shear of the bolster springs 32, the bolster end portions are provided with depending brackets 37 which are connected by longitudinally extending anchors 39, of a type well-known in the art, to brackets 41 depending from the vehicle underframe. Vertical oscillations of the springs 32 are damped by well-known snubbers 43, relatively movable parts of which are connected, respectively to the spring cap 33 and the spring seats 31.

A hydraulic transmission device T is mounted on the vehicle underframe and includes a depending output housing D which is relatively narrow and is elongated transversely of the vehicle. Housing D mounts the transmission output shaft O, which extends lengthwise of the vehicle and is advantageously located substantially at the center of the truck. In order to accommodate a low location of the housing D, which it will be understood, is fixed to the underframe U and cannot swivel with the truck, the portion of the bolster inwardly of the truck side members 10 is widened lengthwise of the truck and is rectangularly apertured as at 44 to receive the lower portion of housing D. To accommodate the transmission output shaft O and the associated universal joints, the middle portion of bolster 19, within the frame side members 10, at either side of aperture 44, is depressed to a much lower level than the spring-carrying end portions. Cardan shafts C connect transmission output shaft O to right angle driving gear boxes B, mounted on axles 2 and 3, respectively. Yoke-like torque arms A on gear boxes B are secured in a well-known manner to brackets 45 on transoms 11 to prevent rotation of the gear boxes about the axles.

During swiveling movements of the truck the bolster, being retained against swiveling relative to the vehicle body, is capable of transverse movement only, relative to the body and accordingly there is no interference between any truck structure and housing D since lateral movements of the body relative to the bolster are limited by the engagement of the upstanding and depending abutments 35 and 36, on the bolster and underframe, respectively.

Details of the arrangement may be varied substantially without departing from the spirit of the invention, and the exclusive use of those modifications as come within the scope of the appended claims is contemplated.

What is claimed is:

1. In a railway vehicle truck, spaced wheel and axle assemblies, a truck frame supported therefrom and having longitudinally-extending sides spaced apart transversely of the truck, a transversely-extending bolster supported on said frame at points spaced from the vertical center line of the truck, pairs of cooperating vertical pivot bearings on said bolster and said frame curved about a vertical axis intermediate said assemblies and in opposed relation with each other transversely and longitudinally of the truck, the transversely-opposed pairs of bearings being positioned adjacent each side of said frame and the longitudinally-opposed pairs of bearings being positioned adjacent each side of said bolster, said bolster being vertically apertured substantially throughout the portion bounded by said bearings, transversely-spaced body-support springs carried by said bolster, and means for restraining said bolster and a supported vehicle body against substantial relative movement longitudinally of the body.

2. In a railway vehicle truck, spaced wheel and axle assemblies, a truck frame supported from said assemblies inwardly of the wheels and including longitudinally-extending sides spaced apart transversely of the truck, a transversely-extending bolster supported on said frame at points spaced from the vertical center line of the truck, pairs of cooperating vertical pivot bearings on said bolster and said frame curved about a vertical axis intermediate said assemblies and in opposed relation with each other transversely and longitudinally of the truck, the transversely-opposed pairs of bearings being positioned adjacent each side of said frame and the longitudinally-opposed pairs of bearings being positioned adjacent each side of said bolster, said bolster being vertically apertured substantially throughout the portion bounded by said bearings, body-support springs carried by said bolster laterally outwardly from the sides of said frame, and means for restraining said bolster and a supported vehicle body against substantial relative movement lengthwise of the body.

3. In a railway vehicle truck, spaced wheel and axle assemblies, a truck frame supported therefrom and including longitudinally-extending side members and transversely-extending transom structures rigidly connecting said side members, said transom structures being spaced apart longitudinally of the truck and, with said side members defining an aperture through said frame, vertical concave bearings on the aperture-defining surfaces of said side members and transoms, a bolster member supported on said side members and having surfaces opposing said aperture defining surfaces, vertical convex bearings on said bolster surfaces in pivot-defining engagement with said concave bearings, transversely-spaced body-support springs carried by said bolster, and means for restraining said bolster and a supported vehicle body against substantial relative movement lengthwise of the body.

4. In a railway vehicle truck, spaced wheel and axle assemblies, a truck frame including side members supported from said assemblies laterally inwardly of the wheels and transversely-extending transom structures rigidly connecting said side members, the portions of said side members between the wheels at each side being bowed laterally outwardly and, with said transom structure defining a vertical aperture through said frame, vertical concave bearings on the aperture-defining surfaces of said side members and transoms, a bolster member supported on the outwardly bowed portions of said side members and having surfaces opposing said aperture-defining surfaces, vertical convex bearings on said bolster surfaces in pivot-defining engagement with said concave bearings, transversely-spaced body-support springs carried by said bolster, and means for restraining said bolster and a supported vehicle body against substantial relative movement lengthwise of the body.

5. In a railway vehicle truck arranged to swivel about a vertical axis, spaced wheel and axle assemblies, longitudinally-extending equalizers carried by said assemblies, longitudinally-spaced springs carried by said equalizers, a rigid truck frame including spaced side members supported from said springs and depressed intermediate said springs, a bolster carried by the depressed portions of said side members, cooperating means on said bolster and said frame defining the swivel axis of the truck and being spaced from said axis, transversely-spaced substantially upright body-support springs carried by said bolster, and means for restraining said bolster and a supported vehicle body against substantial relative movement lengthwise of the body.

6. In a railway vehicle truck, spaced wheel and axle assemblies, a truck frame supported therefrom and comprising transversely-spaced longitudinally-extending wheel pieces and transverse transoms spaced apart lengthwise of the truck, said wheel pieces and transoms defining a vertical aperture through said frame, a transversely extending bolster carried by said frame and having spaced end portions and side members, defining a vertical aperture in registry with the aperture through said frame, cooperating bearing surfaces on said bolster and frame and curved about a vertical axis through said apertures, body-support springs carried by said bolster, and means for restraining said bolster and a supported vehicle body against substantial relative movement lengthwise of the body.

7. In a railway vehicle truck, spaced wheel and axle assemblies, a truck frame supported therefrom and comprising transversely-spaced longitudinally-extending wheel pieces and transverse transoms spaced apart lengthwise of the truck, said wheel pieces and transoms defining a vertical aperture through said frame, a transversely extending bolster having end portions carried by said wheel pieces and side members spaced apart lengthwise of the truck, and with said end portions, defining a vertical aperture in registry with the aperture through said frame, said side members being depressed intermediate said wheel pieces and having vertical surfaces opposing vertical surfaces of said transoms and forming cooperating bearing surfaces curved about a vertical axis through said apertures, vertical surfaces on said wheel pieces and cooperating surfaces on said bolster curved about the same vertical axis, body-support springs carried by said bolster, and means for restraining said bolster and a supported vehicle body against substantial movement relative to each other lengthwise of the body.

8. In a railway vehicle truck, spaced wheel and axle assemblies, a truck frame supported therefrom and comprising transversely-spaced longitudinally-extending wheel pieces and transverse transoms connecting said wheel pieces intermediate said assemblies, said transoms being spaced apart lengthwise of the truck, a bolster supported on said frame at points spaced from the vertical center line of the truck, and received in part in an aperture defined by said transoms and wheel pieces and including a vertical aperture in registry with the frame aperture, driving gear boxes carried by said axles and having torque arms extending lengthwise of the truck and secured to said transoms, transversely-spaced springs carried by said bolster, means for restraining said bolster and a supported vehicle body against movement relative to each other lengthwise of the body, a transmission device adapted to be carried by a supported vehicle body and having a portion projecting downwardly therefrom into the vertical aperture in said bolster, and drive shafts extending substantially longitudinally of the truck and connecting said downwardly projecting portion and said gear boxes.

9. In a railway vehicle truck, spaced wheel and axle assemblies, a truck frame including longitudinally-extending side members spaced apart transversely of the truck supported from said assemblies a bolster elongated transversely of the truck and supported on said side members, pairs of cooperating vertical pivot bearings on said bolster and said frame and curved about a vertical axis substantially mediate said side members and said assemblies and in opposed relation with each other transversely and longitudinally of the truck, the transversely-opposed bearings being spaced apart substantially the same distance as the frame side members and the longitudinally-opposed pairs of bearings being spaced apart substantially the width of said bolster, said bolster being vertically apertured substantially throughout the portion bounded by said bearings, body-support springs carried by the end portions of said bolster outwardly of said aperture, said springs being transversely as well as vertically yieldable whereby to permit and yieldingly resist transverse movements of a supported vehicle body thereon, and means for restraining said bolster and a supported vehicle body against relative movement longitudinally of the body while permitting vertical and transverse movements therebetween.

10. In a railway vehicle truck, spaced wheel and axle assemblies, a truck frame supported therefrom and comprising transversely-spaced longitudinally-extending wheel pieces depressed intermediate said assemblies and transverse transoms spaced apart lengthwise of the truck and connecting the depressed portions of said wheel pieces, said wheel pieces and transoms defining a vertical aperture through said frame, a transversely-extending bolster having end portions carried by said wheel piece depressed portions and side members spaced apart lengthwise of the truck, and with said end portions, defining a vertical aperture in registry with the aperture through said frame, said bolster side members being depressed intermediate said wheel pieces and having vertical surfaces opposing vertical surfaces of said transoms and forming cooperating bearing surfaces curved about a vertical axis through said apertures, vertical surfaces on said wheel pieces and cooperating surfaces on said bolster curved about the same vertical axis, body-support springs carried by said bolster, and means for restraining said bolster and a supported vehicle body against relative movement lengthwise of the body.

11. A railway vehicle comprising a truck having spaced wheel and axle assemblies, a truck frame supported therefrom, a bolster supported on said frame at points spaced from the vertical center line of the truck, cooperating vertical pivot bearings on said bolster and said frame and curved about the vertical center line of the truck and spaced therefrom, the central portion of said bolster being vertically apertured, transversely-spaced springs carried by said bolster, a vehicle body carried by said springs and mounting a transmission device having a portion projecting downwardly into said aperture, a drive shaft extending longitudinally from said downwardly projecting portion and connected to an assembly, and means restraining said bolster and a supported vehicle body against relative movement lengthwise of the body.

References Cited in the file of this patent

UNITED STATES PATENTS

| | | |
|---|---|---|
| 2,500,906 | Soloview | Mar. 14, 1950 |
| 2,620,743 | Taylor | Dec. 9, 1952 |
| 2,885,970 | Heumann | May 12, 1959 |
| 2,908,230 | Dean | Oct. 13, 1959 |